United States Patent

Jolles

[15] 3,665,018

[45] May 23, 1972

[54] NAPHTHACENE DERIVATIVES

[72] Inventor: Georges Jolles, Sceaux, France

[73] Assignee: Rhone-Poulenc S.A., Paris, France

[22] Filed: July 14, 1969

[21] Appl. No.: 841,552

[30] Foreign Application Priority Data

July 15, 1968 France....................................159237
June 2, 1969 France..................................6918032

[52] U.S. Cl..........................260/365, 260/253, 260/293.62, 260/345.9, 424/267, 424/305, 424/309, 424/311
[51] Int. Cl.....................................C07c 87/10, C07c 87/36
[58] Field of Search.........................................260/365, 361

[56] References Cited

OTHER PUBLICATIONS

Arcamone et al., Tetrahedron Letters, 1968, (30), pp. 3353–3356.

*Primary Examiner*—Lorraine A. Weinberger
*Assistant Examiner*—E. Jane Skelly
*Attorney*—Stevens, Davis, Miller & Mosher

[57] ABSTRACT

New derivatives of 4-methoxy-5,12-dioxo-6,9,11-trihydroxy-9-acetyl-5,7,8,9,10,12-hexahydronaphthacene with a substituent —O—CO—R in the 7-position, wherein R represents cyclohexyl substituted by an aminomethyl group, or by at least one amino group, monoalkylamino group of which the alkyl radical contains one to five carbon atoms, dialkylamino group of which each alkyl radical contains one to five carbon atoms, or sulphomethylamino group, or R represents a said substituted-cyclohexyl group also substituted by at least one hydroxy group or alkanoyloxy group of which the alkanoyl radical contains one to five carbon atoms, or R represents a phenylalkyl group of which the alkyl radical contains one to four carbon atoms and is substituted by a bis(2-chlorethyl)amino group, or a piperidyl group, and non-toxic salts thereof, have useful properties against leukaemia L1210 in mice, combined with a low toxicity.

11 Claims, No Drawings

NAPHTHACENE DERIVATIVES

This invention relates to new therapeutically useful naphthacene derivatives, to processes for their preparation and pharmaceutical compositions containing them.

According to the present invention there are provided the new naphthacene derivatives of the general formula:

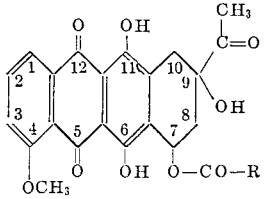

I wherein R represents a cyclohexyl group which is substituted by an aminomethyl group, or by at least one amino group, monoalkylamino group of which the alkyl radical contains one to five carbon atoms, dialkylamino group of which each alkyl radical contains one to five carbon atoms, or sulphomethylamino group, and is optionally substituted by at least one hydroxy group or alkanoyloxy group of which the alkanoyl radical contains one to five carbon atoms (e.g. acetoxy), or R represents a phenylalkyl group of which the alkyl radical contains one to four carbon atoms (e.g. phenethyl) and is substituted by a bis(2-chlorethyl)amino group, or a piperidyl group, and salts thereof.

According to a feature of the invention, the naphthacene derivatives of general formula I are prepared by the process which comprises reacting an acid of the general formula:

$$R - CO - OH \quad \text{II}$$

wherein R is as hereinbefore defined, or a derivative thereof, with the naphthacene derivative of the formula:

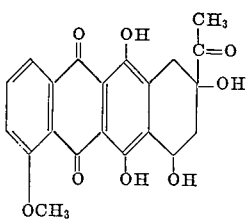

III i.e. 4-methoxy-5,12-dioxo-6,7,9,11-tetrahydroxy-9-acetyl-5,7,8,9,10,12-hexahydronaphthacene, by methods known per se for the preparation of esters.

It is particularly advantageous to use an acid of general formula II of which the amine group or groups is or are protected and of which the carboxyl group is activated. A preferred method consists in preparing in situ, by the action of benzenesulphonyl chloride in pyridine, the anhydride of an acid corresponding to formula II of which the amine group or groups is or are optionally protected, and then reacting the anhydride with the naphthacene derivative of formula III at a temperature between −5° and +20° C.

The groups protecting the amine group or groups during the reaction may be removed by procedures which do not affect the rest of the molecule. Preferably, the protective group is a tert-butyloxycarbonyl, benzyloxycarbonyl or p-methoxybenzyloxycarbonyl radical, which can be removed in a dilute acid medium.

The naphthacene derivatives of general formula I in which R represents a cyclohexyl radical substituted by at least one sulphomethylamino group, and optionally substituted by at least one hydroxy group or alkanoyloxy group as hereinbefore specified, may also be prepared by the reaction of formaldehyde and sodium metabisulphite ($Na_2S_2O_5$) with a naphthacene derivative of general formula I in which R represents a cyclohexyl radical substituted by at least one amino group and optionally substituted by at least one hydroxy radical or alkanoyloxy group as hereinbefore specified, or a salt thereof. The reaction is generally effected in an aqueous medium at a temperature close to 20° C. and at a pH close to neutrality.

The naphthacene derivative of formula III used as starting material is the aglycone of the antibiotic designated by the number 13,057 R.P., which has been given the name "daunorubicin" (formerly "rubidomycin"). This antibiotic of the formula:

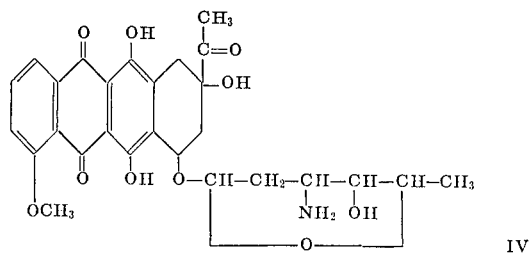

IV is produced by aerobic culture in a nutrient medium containing assimilable sources of carbon, nitrogen and inorganic salts, of the strain Streptomyces 8899 or Streptomyces 31,723 deposited at the Northern Regional Research Laboratory of Peoria, Illinois, United States of America, under the respective references "NRRL 3046" and "NRRL 3045," and accessible to the public. The antibiotic 13,057 R.P. produced by these strains of Streptomyces is separated from the culture medium by application of conventional method of extraction of alkaline antibiotics, for example those described in British Pat. No. 985,598.

The aglycone of daunorubicin can be obtained by acid hydrolysis of the antibiotic 13,057 R.P. in a normal sulphuric acid medium at 100° C. for 20 minutes, and extraction with ethyl acetate. The crude product obtained can be purified by chromatography on Arches paper No. 310 impregnated with a solution of acetone containing 20 percent of formamide, the chromatogram being developed for 90 minutes by means of a mixture of chloroform-benzene (2:1) saturated with formamide. The product of Rf 0.86 is extracted by methanol according to conventional methods; after concentration of the extracts and addition of water, a precipitate is obtained which is dried and dissolved in dioxane containing 20 percent of water. After the dropwise addition of water acidified to pH 4 by means of 0.1N hydrochloric acid, crystals appear. After filtering, washing and drying, the aglycone of daunorubicin is obtained in the form of orange-red needles melting at 160° C. and then at 225°–230° C.

The naphthacene derivatives of general formula I, except for those in which R represents a cyclohexyl group substituted by at least one sulphomethylamino group and optionally substituted by at least one hydroxy or alkanoyloxy group as hereinbefore specified, can be converted into acid addition or quaternary ammonium salts. The salts may be obtained by reaction of the compounds of formula I with acids or with esters in appropriate solvents. Water, alcohols, ethers, ketones or chlorinated hydrocarbons may, for example, be used as solvents. The salt which is formed is precipitated, if necessary after concentration of its solution, and is separated by filtration, decantation or lyophilisation.

The naphthacene derivatives of general formula I wherein R represents a cyclohexyl radical substituted by at least one sulphomethylamino group and optionally by at least one hydroxy or alkanoyloxy group as hereinbefore specified, may be converted into alkali metal salts or into addition salts with a nitrogen-containing base by application of methods which are known per se. Thus, these salts can be obtained by the reaction of an alkaline base, ammonia or an amine with the compounds of general formula I wherein R represents a cyclohexyl radical substituted by at least one sulphomethylamino group and optionally substituted by at least one hydroxy or alkanoyloxy group as hereinbefore specified, in an appropriate solvent such as water, an alcohol, an ether, a ketone or a chlorinated hydrocarbon. The salt which is formed precipitates after concentration of the solution and is separated by filtration, decantation or lyophilisation.

The naphthacene derivatives of general formula I and their salts have a low toxicity.

They have proved particularly active against leukaemia L1210 (administered intra-peritoneally). The experiments were carried out on one month old mice weighing 18 to 20 g. intra-peritoneally grafted with $10^3$ leukaemia L 1210 cells and treated daily with doses of the naphthacene derivatives between 0.5 and 5 mg./kg. (i.p.).

For therapeutic purposes, the naphthacene derivatives of formula I may be employed as such or in the form of non-toxic salts, i.e. salts containing ions which are relatively innocuous to the animal organism in therapeutic doses of the salts, e.g. acid addition salts such as hydrochlorides, sulphates, nitrates, phosphates, acetates, propionates, succinates, benzoates, fumarates, maleates, tartrates, theophylline-acetates, salicylates, phenolphthalinates or methylene-bis-β-hydroxynaphthoates, metal salts such as the sodium salts, or salts with nitrogen-containing bases. They may also be employed in the form of non-toxic quaternary ammonium salts obtained by reaction of the naphthacene derivatives with organic halides, e.g. methyl, ethyl allyl or benzyl chloride, bromide or iodide, or other reactive esters, e.g. methyl- or ethyl- sulphates, benzenesulphonates or toluene-p-sulphonates.

The following Examples illustrate the invention.

EXAMPLE 1

3-p-Methoxybenzyloxycarbonylamino-cyclohexane-carboxylic acid (3 g.), obtained from 3-amino-cyclohexane-carboxylic acid by the usual methods of peptide chemistry, is dissolved in anhydrous pyridine (135 cc.). The solution is cooled to 0° C. and benzenesulphonyl chloride (4.05 g.) is added. Stirring is continued for 5 minutes and thereafter 4-methoxy-5,12-dioxo-6,7,9,11-tetrahydroxy-9-acetyl-5,7,8,9,-10,12-hexahydronaphthacene (3.9 g.) is added. The stirring is continued for 24 hours whilst keeping the temperature at 0° C., and the resulting solution is poured onto a mixture of water and ice of approximate volume 2 litres. The mixture is extracted with methylene chloride (3 × 1 litre) and the organic extracts are then washed with water (500 cc.). The organic phase is dried over anhydrous sodium sulphate and filtered, and the filtrate is evaporated to dryness under reduced pressure (20 mm.Hg). A crude product (6 g.) is thus obtained and is dissolved in methylene chloride (25 cc.). The solution is passed through a column of silica gel (100 g.) (column diameter 24 mm.). Elution is carried out with a mixture of methylene chloride-methanol (99-1 by volume). The first four fractions obtained (240cc. total) are evaporated to dryness under reduced pressure (20 mm.Hg). 4-Methoxy-5,12-dioxo-6,9,11-trihydroxy-7-(3-p-methoxybenzyloxycarbonylamino-cyclohexylcarbonyloxy)-9-acetyl-5,7,8,9,10,12-hexahydronaphthacene (4.5 g.) is thus obtained.

This product is dissolved in a 2N anhydrous solution of hydrogen chloride in dioxane (450 cc.). The solution obtained is stirred for 3 hours at ambient temperature. The resulting suspension is evaporated to dryness under reduced pressure (20 mm.Hg). The dry residue is taken up in methylene chloride (300 cc.) and the crystals which have appeared are separated by filtration. The crystals are washed with methylene chloride (3 × 100 cc.), and dried under reduced pressure (0.3 mm.Hg).

The crystals obtained are dissolved in distilled water (100 cc.). A slight amount of insoluble matter is filtered off and the filtrate is lyophilised. 4-Methoxy-5,12-dioxo-6,9,11-trihydroxy-7-(3-amino- cyclohexylcarbonyloxy)-9-acetyl-5,7,8,9,10,12-hexahydronaphthacene hydrochloride (or the hydrochloride of daunorubicin aglycone 3-amino-cyclo-hexanecarboxylate)(2.33 g.) is thus obtained.

N % = 2.78 (theory = 2.50)

Ultra-violet spectrum:
  λ max. = 232.5 nm ; ε = 41,290
  λ max. = 254 nm ; ε = 27,450
  λ max. = 290 nm ; ε = 10,430

EXAMPLE 2

2-Bis(2-chlorethyl)amino-3-phenylpropionic acid (1.24 g.), prepared according to W. Lee et al [J. Med. Chem. 6,439 (1963)]is dissolved in pyridine (60 cc.) and the resulting solution is cooled to 0° C. Benzenesulphonyl chloride (1.58 g.) is added followed by 4-methoxy-5,12-dioxo-6,7,9,11-tetrahydroxy-9-acetyl-5,7,8,9,10,12-hexahydronaphthacene (1.52 g.). The resulting solution is stirred for 17 hours at 0° C. and then poured into ice-cold water (1,500 cc.). The mixture is filtered through sintered glass, and the resulting precipitate is washed with ice water (15 cc.), filtered and dried under reduced pressure (0.3 mm.Hg). The resulting product (3 g.), dissolved in methylene chloride (45 cc.), is chromatographed through a column 1.2 cm. in diameter containing silica gel (50 g.), initially by means of methylene chloride (10 × 50 cc.) and then by a mixture of methylene chloride — methanol (98-2 by volume). The first 150 cc. of the second eluate are evaporated to dryness under reduced pressure (25 mm.Hg). The residue is dried under reduced pressure (0.3 mm.Hg) to yield 4-methoxy-5,12-dioxo-6,9,11-trihydroxy-7-[2-bis(2-chlorethyl)-amino-3-phenylpropionyloxy]-9-acetyl-5,7,8,9,10,12-hexahydronaphthacene (or daunorubicin aglycone 2-bis(2-chlorethyl)-amino-3-phenylpropionate) (0.9 g.).

N % = 1.80 (theory = 2.08)

Rf = 0.88 [1,2-dichloroethane-methanol (88–12 by volume)]

EXAMPLE 3

By proceeding as described in Example 1 but using 4-p-methoxybenzyloxycarbonylamino-cyclohexanecarboxylic acid (0.773 g.), pyridine (40 cc.), benzenesulphonyl chloride (1.05 g.) and 4-methoxy-5,12-dioxo-6,7,9,11-tetrahydroxy-9-acetyl-5,7,8,9,10,12-hexahydronaphthacene (1 g.), 4-methoxy-5,12-dioxo-6,9,11-trihydroxy-7-(4-amino-cyclohexylcarbonyloxy)-9-acetyl-5,7,8,9,10,12-hexahydronaphthacene hydrochloride (or the hydrochloride of daunorubicin aglycone 4-amino-cyclohexanecarboxylate) (0.59 g.) is obtained.

N % = 2.45 (theory = 2.50)
Cl % = 6.4 (theory = 6.33)
Ultra-violet spectrum :
  λmax. = 232 nm ; ε = 25,380
  λmax. = 254 nm ; ε = 17,310
  λmax. = 290 nm ; ε = 6,350

EXAMPLE 4

By proceeding as described in Example 1 but using 2-p-methoxybenzyloxycarbonylamino-cylcohexanecarboxylic acid (0.560 g.), pyridine (30 cc.), benzenesulphonyl chloride )0.765 g.) and 4-methoxy-5,12-dioxo-6,7,9,11-tetrahydroxy-9-acetyl-5,7,8,9,10,12-hexahydronaphthacene (0.725 g.), 4-methoxy-5,12-dioxo-6,9,11-trihydroxy-7-(2-amino-cyclo-hexylcarbonyloxy)-9-acetyl-5,7,8,9,10,12-hexahydronaphthacene hydrochloride (or the hydrochloride of daunorubicin aglycone 2-amino-cyclohexanecarboxylate) (0.25 g.) is obtained.

N % = 2.18 (theory = 2.49)
Ultra-violet spectrum:
  λmax. = 232.5 nm ; ε = 29,200
  λmax. = 253 nm ; ε = 19,200
  λmax. = 290 nm ; ε = 7,840

EXAMPLE 5

By proceeding as described in Example 1 but using 4-p-methoxybenzyloxycarbonylaminomethyl-cyclohexanecarboxylic acid (1.91 g.), pyridine (80 cc.), benzenesulphonyl chloride (2.10 g.) and 4-methoxy-5,12-dioxo-6,7,9,11- tetrahydroxy-9-acetyl-5,7,8,9,10,12-hexahydronaphthacene (2 g.), 4-methoxy-5,12-dioxo-6,9,11-trihydroxy-7-(4-aminomethyl-cyclohexylcarbonyloxy)-9-acetyl-5,7,8,9,10,12-hexahydronaphthacene hydrochloride (or the hydrochloride of daunorubicin aglycone 4-aminomethyl-cyclohexanecarboxylate) (0.78 g.) is obtained.

N % = 2.76 (theory = 2.44)
Ultra-violet spectrum:
λmax. = 232 nm ; ε = 29,700
λmax. = 253 nm ; ε = 20,900
λmax. = 286 nm ; ε = 8,600

EXAMPLE 6

3-Dimethylamino-cyclohexanecarboxylic acid hydrochloride (0.93 g.) is dissolved in pyridine (40 cc.) containing triethylamine (0.73 cc.). This solution is cooled to 0° C. and benzenesulphonylchloride (2.22 g.) is then added. The mixture is stirred for 3 minutes and 4-methoxy-5,12-dioxo-6,7,9,11-tetrahydroxy-9-acetyl-5,7,8,9,10,12-hexahydronapthacene (2.12 g.) is then added. Thereafter the stirring is continued for 17 hours at 0° C. The resulting solution is poured into a mixture of water and ice (about 1200 cc.) containing 1.25 percent of sodium bicarbonate. The mixture is extracted with methylene chloride (3 × 1 litre). The combined organic extracts are washed with water (2 × 500 cc.), dried over anhydrous sodium sulphate and then filtered. The filtrate is concentrated to dryness under reduced pressure (20 mm.Hg). The resulting residue is dissolved in methylene chloride (30 cc.) and the solution obtained is chromatographed through a column 9 mm. in diameter containing silica gel (15 g.). Elution is carried out with a mixture of methylene chloride-methanol (75-25 by volume), collecting 30 cc. fractions. Fractions 1 to 10 (300 cc.) are discarded; fractions 11 to 21 (330 cc.) are combined and concentrated to dryness under reduced pressure (20 mm.Hg). The residue thus obtained is taken up in water (100 cc.) and the solution is then acidified to a pH of about 2 by adding 1N hydrochloric acid. The resulting red solution is lyophilised to yield 4-methoxy-5,12-dioxo-6,9,11-trihydroxy-7-(3-dimethylaminocyclohexylcarbonyloxy)-9-acetyl-5,7,8,9,10,12-hexahydronaphthacene hydrochloride (or the hydrochloride of daunorubicin aglycone 3-dimethylaminocyclohexanecarboxylate) (0.45 g.).

N % = 2.32 (theory =2.38)
Ultra-violet spectrum:
λmax. = 232 nm ; ε =31,180
λmax. = 253 nm ; ε = 19,150
λmax. = 290 nm ; ε = 7,530

EXAMPLE 7

3-p-Methoxybenzyloxycarbonylpiperidyl-carboxylic acid (obtained from 3-piperidyl-carboxylic acid) (1.73 g.) is dissolved in anhydrous pyridine (83 cc.). This solution is cooled to 0° C. and benzenesulphonyl chloride (2.46 g.) is added followed by 4-methoxy-5,12-dioxo-6,7,9,11-tetrahydroxy-9-acetyl-5,7,8,9,10,12-hexahydronaphthacene (2.88 g.). The mixture is stirred for 24 hours whilst keeping the temperature at 0° C. The resulting solution is poured into a mixture of water and ice (about 1.5 litres). The mixture is extracted with methylene chloride (1 litre) followed by 2 × 500 cc.). The organic extracts are combined and dried over anhydrous sodium sulphate, filtered and concentrated to dryness under reduced pressure (20 mm.Hg). The resulting residue is dissolved in methylene chloride (10 cc.) and the solution is chromatographed through a column 16 mm. in diameter containing silica gel (50 g.). Elution is first carried out with methylene chloride and 8 fractions of 20 cc. of eluate are collected and discarded. Thereafter elution is carried out with a mixture of methylene chloride-methanol (98-2 by volume) and 6 fractions of 20 cc. (total 120 cc.) are collected. These fractions are combined and concentrated to dryness under reduced pressure (20 mm.Hg) to yield 4-methoxy-5,12-dioxo-6,9,11-trihydroxy-7-(3-p-methoxybenzyloxycarbonylpiperidylcarbonyloxy)-9-acetyl-5,7,8,9,10,12-hexahydronaphthacene (3.4 g.).

This product (3.1 g.) is dissolved in a 2N anhydrous solution of hydrogen chloride in dioxane (300 cc.); the resulting solution is stirred for 4 hours at about 20° C. and is then concentrated to dryness under reduced pressure (20 mm.Hg). The residue is taken up in methylene chloride (10 cc.) and the solution obtained is chromatographed through a column 9 mm. in diameter containing silica gel (40 g.). Elution is first carried out with a mixture of methylene chloride-methanol (95-5 by volume) and 8 fractions of 10 cc. (total 80 cc.) are collected and discarded. Thereafter elution is carried out with a mixture of methylene chloride-methanol (90–10 by volume) and 7 fractions of 10 cc. (total 70 cc.) are collected. These fractions are combined, concentrated to dryness under reduced pressure (20 mm.Hg), and the residue taken up in distilled water (100 cc.). The resulting red solution is lyophilised to yield 4-methoxy-5,12-dioxo-6,9,11-trihydroxy-7-(3-piperidyl-carbonyloxy)-9-acetyl-5,7,8,9,10,12-hexahydronaphthacene hydrochloride (or the hydrochloride of daunorubicin aglycone 3-piperidyl-carboxylate) (1.65 g.).

N % = 2.78 (theory=2.57)
Cl % = 6.79 (theory=6.49)
Ultra-violet spectrum:
λmax. = 232 nm ; ε = 33,200
λmax. = 253 nm ; ε = 20,500
λmax. = 287 nm ; ε = 7,920

EXAMPLE 8

By proceeding as described in Example 7 but using 3-p-methoxybenzyloxycarbonylamino-4-acetoxy-cyclohexanecarboxylic acid (2.39 g.), anhydrous pyridine (92 cc.), benzenesulphonyl chloride (2.64 g.), and 4-methoxy-5,12-dioxo-6,7,9,11-tetrahydroxy-9-acetyl-5,7,8,9,10,12-hexahydro-naphthacene (2.64 g.), followed by a 2N anhydrous solution of hydrogen chloride in dioxane (350 cc.), 4-methoxy-5,12-dioxo-6,9,11-trihydroxy-7-(3-amino-4-acetoxy-cyclohexylcarbonyloxy)-9-acetyl-5,7,8,9,10,12-hexahydronaphthacene hydrochloride (or the hydrochloride of daunorubicin aglycone 3-amino-4-acetoxy-cyclohexanecarboxylate) (0.85 g.) is obtained.

N % = 2.55 (theory = 2.26)
Ultra-violet spectrum:
λmax. = 232.5 nm ; ε = 33.790
λmax. = 253 nm ; ε = 20,360
λmax. = 288 nm ; ε = 7,915

EXAMPLE 9

By proceeding as described in Example 7 but using 3-p-methoxybenzyloxycarbonylamino-4-tetrahydropyranyloxy-cyclohexanecarboxylic acid (4.5 g.), anhydrous pyridine (135 cc.), benzenesulphonyl chloride (4.5 g.) and 4-methoxy-5,12-dioxo-5,7,9,11-tetrahydroxy-9-acetyl-5,7,8,9,10,12-hexahydro-naphthacene (4.15 g.), followed by a 2N solution of hydrogen chloride in dioxane (320 cc.), 4-methoxy-5,12-dioxo-6,9,11-trihydroxy-7-(3-amino-4-hydroxy-cyclohexylcarbonyloxy)-9-acetyl-5,7,8,9,10,12-hexahydronaphthacene hydrochloride (or the hydrochloride of daunorubicin aglycone 3-amino-4-hydroxycyclohexanecarboxylate) (0.75 g.) is obtained.

N % = 2.4 (theory =2.43)
Ultra-violet spectrum:
λmax. = 232.5 nm ; ε = 39,030
λmax. = 253 nm ; ε = 25,010
λmax. = 287 nm ; ε = 9,700

EXAMPLE 10

4-Methoxy-5,12-dioxo-6,9,11-trihydroxy-7-(3-amino-cyclohexylcarbonyloxy)-9-acetyl-5,7,8,9,10,12-hexahydro-naphthacene hydrochloride (2.8 g.) is dissolved in distilled water (50 cc.) to which methanol (50 cc.) has been added. The resulting solution is stirred and a 30 percent aqueous solution of formaldehyde (5 cc.) is added, followed by a saturated aqueous solution of sodium bicarbonate (25 cc.). The resulting red precipitate is filtered off, washed with water (50 cc.)

and then suspended in water (100 cc.). Sodium metabisulphite ($Na_2S_2O_5$; 1.9 g.) is added to this suspension with stirring and the stirring is continued for 25 minutes at about 20° C. A considerable part of the product initially in suspension dissolves; the insoluble residue is filtered off and washed with water (5 cc.). The washings are combined with the filtrate and the resulting solution is lyophilised. A dry residue (2.1 g.) is thus obtained. In order to remove the inorganic salts present in this residue, it is taken up in anhydrous dimethylformamide (150 cc.) and the resulting suspension is stirred for 5 minutes. The mixture is filtered through sintered glass, the precipitate is washed with dimethylformamide (50 cc.), and the washings are combined with the filtrate and the solution then concentrated to dryness under reduced pressure (0.3 mm.Hg). The red residue is taken up in water (100 cc.) and lyophilised. The sodium salt of 4-methoxy-5,12-dioxo-6,9,11-trihydroxy-7-(3-sulphomethylamino-cyclohexylcarbonyloxy)-9-acetyl-5,7,8,9,10,12-hexahydronaphthacene (or the sodium salt of daunorubicin aglycone 3-sulphomethylamino-cyclohexanecarboxylate) (1.45 g.) is thus obtained.

N % = 2.2 (theory = 2.18)
S % = 5.7 (theory = 5.01)
Ultra-violet spectrum:
$\lambda$max. = 232 nm ; $\epsilon$ = 39,825
$\lambda$max. = 252 nm ; $\epsilon$ = 24,860
$\lambda$max. = 290 nm ; $\epsilon$ = 11,100

The present invention includes within its scope pharmaceutical compositions which comprise at least one of the naphthacene derivatives of general formula I, or a non-toxic salt thereof, in association with a pharmaceutically acceptable carrier or coating. The compounds of the present invention will normally be administered orally, parenterally or rectally; intravenous administration is the preferred method.

Solid compositions for oral administration include compressed tablets, pills, powders, and granules. In such solid compositions one or more of the active compounds is, or are, admixed with at least one inert diluent such as starch, sucrose or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without addition of diluents or excipients.

Preparations according to the invention for parenteral administration include sterile aqueous or non-aqueous solutions, suspensions, or emulsions. Examples of non-aqueous solvents or suspending media are propylene glycol, vegetable oils such as olive oil, and injectable organic esters such as ethyl oleate. These compositions may also contain adjuvants such as preserving, wetting, emulsifying and dispersing agents. They may be sertilised by, for example, filtration through a bacteria-retaining filter, by incorporation in the compositions of sterilizing agents, by irradiation, or by heating. They may also be manufactured in the form of sterile solid compositions, which can be dissolved or dispersed in sterile water or some other sterile injectable medium immediately before use.

Compositions for rectal administration are suppositories which contain, in addition to the active substance, excipients such as cacao butter, a suitable wax base or solidified glycerin.

The percentage of active ingredient in the compositions of the invention may be varied, it being necessary that it should constitute a proportion such that a suitable dosage shall be obtained. The dosage will depend upon the therapeutic effect sought, the route of administration, and the length of treatment.

The following Example illustrates pharmaceutical compositions according to the invention.

EXAMPLE 11

A solution of the following composition is prepared:

4-methoxy-5,12-dioxo-6,9,11-trihydroxy-7-(3-amino-cyclohexylcarbonyloxy)-9-acetyl-5,7,8,9,10,12-hexahydro-naphthacene hydrochloride    1.065 g.
distilled wafer    100 cc.

This solution is sterilised by filtering through a bacteriostatic filter and is then divided into ampoules in a quantity of 10 cc. per ampoule. The ampoules are thereafter lyophilised under a nitrogen atmosphere and sealed.

For intravenous administration an injectable solution is prepared immediately before use by adding 5 cc. of physiological serum to the contents of the ampoule. A 5 cc. solution containing 100 mg. of active product is thus obtained.

I claim:

1. A naphthacene derivative of the formula:

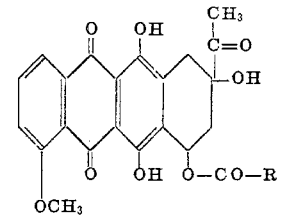

wherein R is cyclohexyl substituted by aminomethyl, amino, dialkylamino in which each alkyl is of one to five carbon atoms, or sulphomethylamino, or R is cyclohexyl substituted by amino and hydroxy or by amino and alkanoyloxy in which the alkanoyl is of one to five carbon atoms, or R is phenylalkyl of which the alkyl is of one to four carbon atoms and is substituted by bis-(2-chloroethyl)amino and non-toxic salts thereof.

2. A naphthacene compound according to claim 1 wherein R is cyclohexyl substituted by aminomethyl or amino, or phenylalkyl of which the alkyl radical is of one to four carbon atoms substituted by bis(2-chloro-ethyl)amino.

3. The naphthacene derivative according to claim 1 which is 4-methoxy-5,12dioxo-6,9,11-trihydroxy-7-(3-amino-cyclohexylcarbonyloxy)-9-acetyl-5,7,8,9,10,12-hexahydronaphthacene, and non-toxic acid addition salts thereof.

4. The naphthacene derivative according to claim 1 which is 4-methoxy-5,12dioxo-6,9,11-trihydroxy-7-[2-bis(2-chlorethyl)amino-3-phenylpropionyloxy]-9-acetyl-5,7,8,9,10,12-hexahydronaphthacene and acid addition and quaternary ammonium salts thereof.

5. The naphthacene derivative according to claim 1 which is 4-methoxy-5,12dioxo-6,9,11-trihydroxy-7-(4-amino-cyclohexylcarbonyloxy)-9-acetyl-5,7,8,9,10,12-hexahydronaphthacene, and non-toxic acid addition salts thereof.

6. The naphthacene derivative according to claim 1 which is 4-methoxy-5,12dioxo-6,9,11-trihydroxy-7-(2-amino-cyclohexylcarbonyloxy)-9-acetyl-5,7,8,9,10,12-hexahydronaphthacene, and non-toxic acid addition salts thereof.

7. The naphthacene derivative according to claim 1 which is 4-methoxy-5,12dioxo-6,9,11-trihydroxy-7-(4-aminomethyl-cyclohexylcarbonyloxy)-9-acetyl-5,7,8,9,10,12-hexahydronaphthacene, and non-toxic acid addition salts thereof.

8. The naphthacene derivative according to claim 1 which is 4-methoxy-5,12dioxo-6,9,11-trihydroxy-7-(3-dimethylamino-cyclohexylcarbonyloxy)-9-acetyl-5,7,8,9,10,12-hexahydronaphthacene, and non-toxic acid addition and quaternary ammonium salts thereof.

9. The naphthacene derivative according to claim 1 which is 4-methoxy-5,12dioxo-6,9,11-trihydroxy-7-(3-amino-4- acetoxy-cyclohexylcarbonyloxy)-9-acetyl-5,7,8,9,10,12-hexahydronaphthacene, and non-toxic acid addition salts thereof.

10. The naphthacene derivative according to claim 1 which is 4-methoxy-5,12-dioxo-6,9,11-trihydroxy-7-(3-amino-4-hydroxy-cyclohexylcarbonyloxy)-9-acetyl-5,7,8,9,10,12-hexahydronaphthacene, and non-toxic acid addition salts thereof.

11. The naphthacene derivative according to claim 1 which is 4-methoxy-5,12-dioxo-6,9,11-trihydroxy-7-(3-sulphomethylamino-cyclohexylcarbonyloxy)-9-acetyl-5,7,8,9,10,12-hexahydronaphthacene, and its alkali metal salts and salts with a non-toxic nitrogen-containing base.

* * * * *